United States Patent [19]
Dent et al.

[11] 3,901,073
[45] Aug. 26, 1975

[54] APPARATUS FOR CARRYING OUT ULTRASONIC INSPECTION OF PRESSURE VESSELS

[75] Inventors: Kenneth Henry Dent, Northwich; Frank Geoffrey Greenhalgh, Culcheth, both of England

[73] Assignee: United Kingdom Atomic Energy Authority, London, England

[22] Filed: Dec. 11, 1973

[21] Appl. No.: 423,786

[30] Foreign Application Priority Data
Dec. 18, 1972 United Kingdom............... 58345/72

[52] U.S. Cl............................ 73/71.5 US; 73/67.8 S
[51] Int. Cl. ............................................ G01n 29/04
[58] Field of Search................... 73/67.8 S, 71.5 US

[56] References Cited
UNITED STATES PATENTS
3,002,375  10/1961  Moffatt et al...................... 73/67.8 S
3,780,571  12/1973  Wiesener.................. 73/71.5 US X FOREIGN PATENTS OR APPLICATIONS
1,595,825  7/1970  France.............................. 73/67.8 S Primary Examiner—Charles A. Ruehl
Attorney, Agent, or Firm—Larson, Taylor & Hinds

[57] ABSTRACT

Apparatus for moving an ultrasonic scanning mechanism over the interior surface of a pressure vessel and comprising a mast for supporting the scanning mechanism inside the vessel and a carriage for traversing the mast within the vessel, the mast being pivotably secured to the carriage so that when the ultrasonic scanning mechanism contacts the interior surface of the pressure vessel the mast is caused to pivot.

5 Claims, 3 Drawing Figures

APPARATUS FOR CARRYING OUT ULTRASONIC INSPECTION OF PRESSURE VESSELS

BACKGROUND OF THE INVENTION

This invention relates to apparatus for carrying out ultrasonic inspection of pressure vessels and especially for the inspection of nuclear reactor pressure vessels.

SUMMARY OF THE INVENTION

According to the invention apparatus for moving an ultrasonic scanning mechanism over the interior surface of a pressure vessel comprises a mast for supporting ultrasonic scanning mechanism inside the vessel and a carriage for traversing the mast within the vessel, the mast being pivotably secured to the carriage so that when the ultrasonic scanning mechanism contacts the interior surface of the pressure vessel the mast is caused to pivot. By pivoting the mast from the carriage the mast can yield to the reaction of contact with the interior surface of the vessel and thereby avoid excessive loading of the ultrasonic scanner mechanism and deflection of the beam.

Preferably, the mast depends from the carriage and is pivoted off-axis so that when the mast is hanging freely within a pressure vessel, the longitudinal axis of the mast tends to incline. Thus the centre of gravity of the mast, scanner carriage and ultrasonic scanner mechanism combination can be utilized to urge the ultrasonic scanning mechanism into contact with the interior surface of the vessel and any irregularity or eccentricity of the surface is accommodated by pivoting of the mast.

DESCRIPTION OF THE DRAWING

A construction of apparatus having a mast and mast carriage for carrying out ultrasonic inspection of pressure vessels will now be described, by way of example, with reference to the accompanying drawings wherein.

DESCRIPTION OF THE PREFERRED EMBODIMENT

Figure 1:
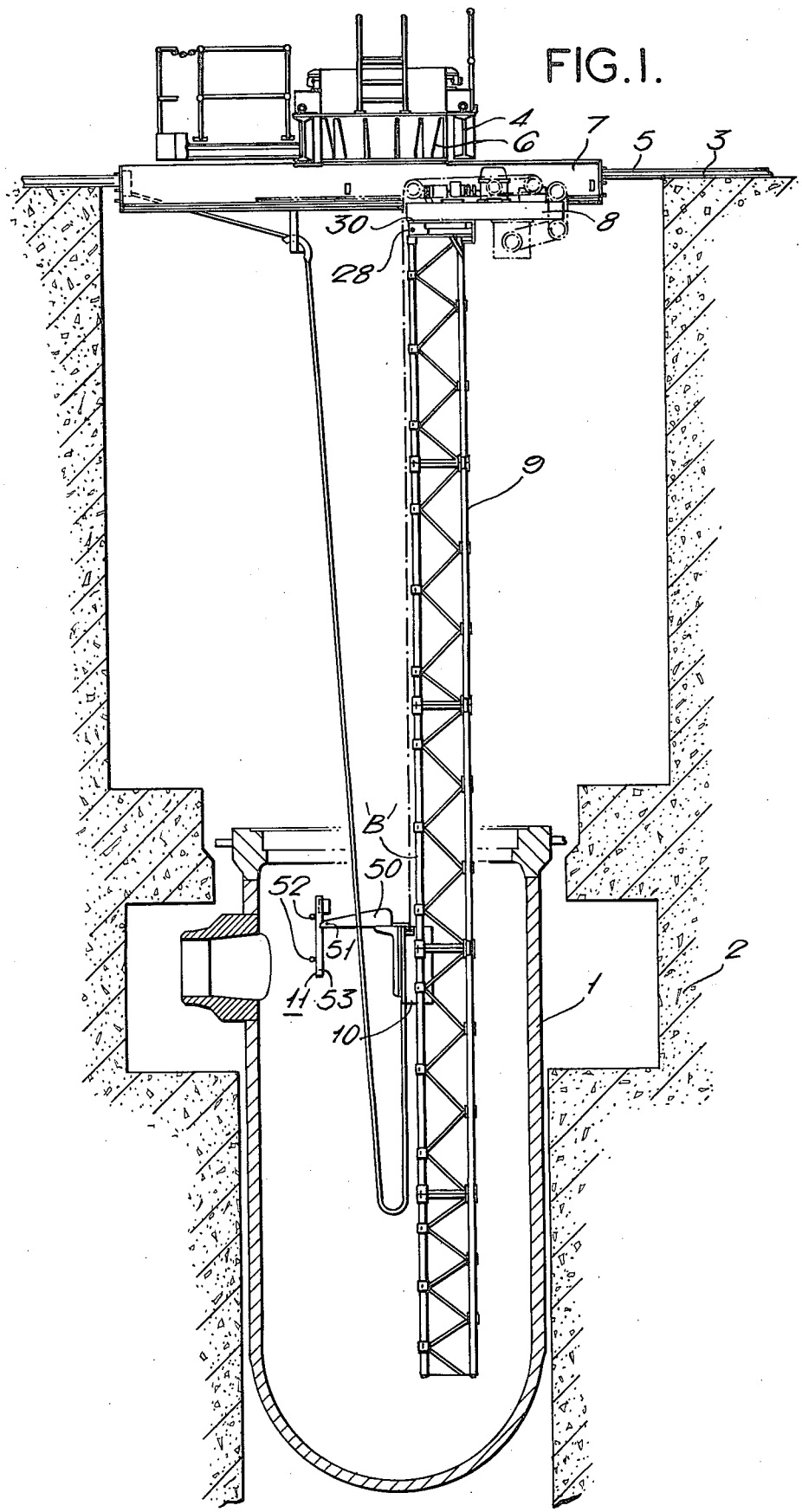
FIG. 1 is a side view of the apparatus in position for inspecting a pressure vessel

In FIG. 1 a reactor pressure vessel designated 1, such as a vessel for a reactor known as a pressurized water reactor, is shown located within a massive shielding structure 2 and the top face 3 of the structure provides an operating floor from which operations can be conducted on the vessel. The vessel is shown with the cover removed and the apparatus comprises a bridge 4 movable along rails 5 which span the mouth of the vessel. The bridge has a slewing ring (or turntable) 6 located on it and the ring carries a beam 7 which can be orientated in any direction in a plane parallel to the plane of the mouth of the vessel by rotation of the slewing ring. A carriage 8 (hereinafter termed the "mast carriage") is provided on the beam 7 and is movable linearly along the beam. Depending from the carriage there is a mast 9 extending downwardly into the pressure vessel. The mast also has a carriage 10 (hereinafter termed the "scanner carriage") movable linearly up and down the mast. The scanner carriage 10 supports an ultrasonic scanning mechanism 11 having an ultrasonic transmit/receive head (not shown) to scan the interior surfaces of the vessel.

Figure 2:
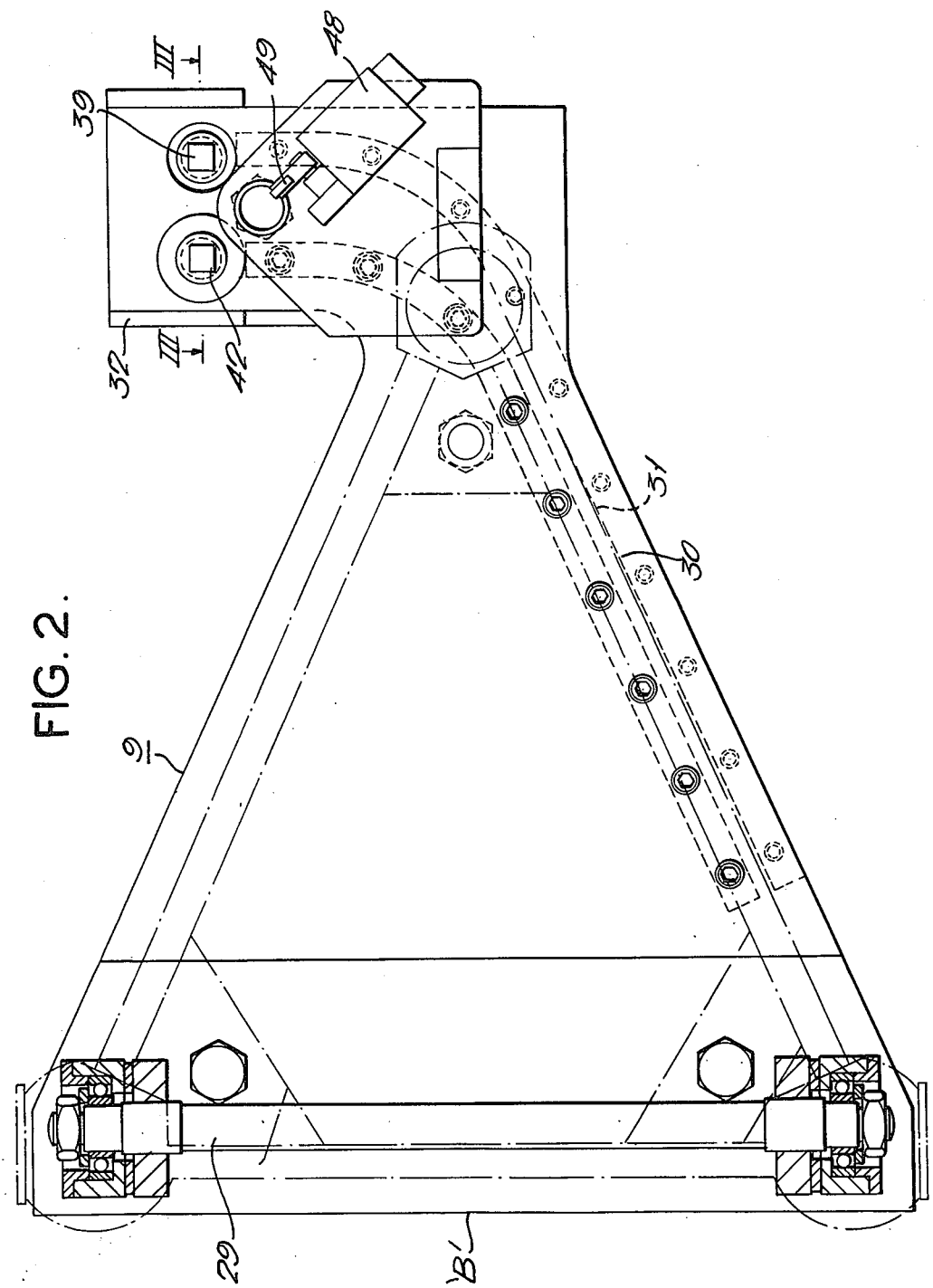
FIG. 2 is a fragmentary plan view of the mast.

The mast 9 is of lattice construction and as shown in FIG. 2 is generally triangular in plan and cross-section. The mast depends from the mast carriage at a pivotable joint 28 (FIG. 1) the pivot pin 29 (FIG. 2) extending across the width of one side (conveniently termed the "base" and designated 'B') so that the mast is pivoted off-axis. The mast upper hinge member designated 30 in FIG. 1 is secured to the underside of the mast carriage. The scanner carriage is slidable on the base side 'B' so that the centre of gravity of the mast 9, scanner carriage 10 and ultrasonic scanning mechanism 11 combination serves to urge the ultrasonic scanning mechanism into contact with the interior surface of the vessel.

Figure 3:
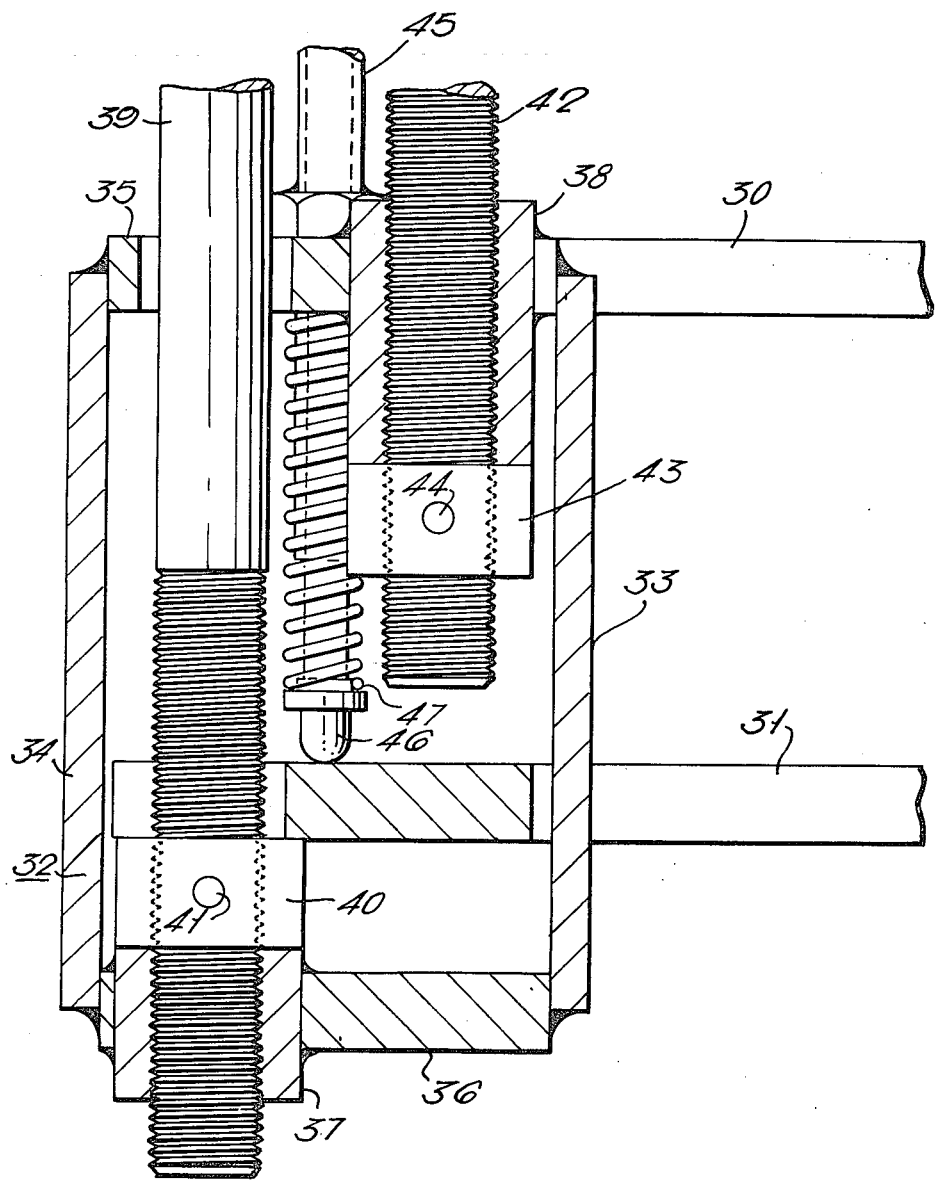
FIG. 3 is a section on line III—III of FIG. 2.

Referring now to FIG. 3 the apex of the triangular upper hinge member 30 and the apex of a mast plate 31 are shown. A cage 32 is secured to the member 30. The cage comprises side plates 33, 34 a top plate 36 and a bottom plate 36. The bottom plate carries a screw-threaded boss 37 and the top plate carries a screw-threaded boss 38. A rod 39 is threaded in boss 37 and it carries a collar 40 secured to the rod by a pin 41. A rod 42 is threaded in boss 38 and it carries a collar 43 secured to the rod by a pin 44.

The top plate 35 also carries a sleeve 45 in which an indicator probe 46 is housed and which is movable against a spring 47. The probe operates a limit switch 48 through a roller 49 shown in FIG. 2.

Since the mast, and mast plate 31 are pivoted off-axis, the plate 31 will normally be urged against the collar 40 by gravity, the collar 40 can therefore serve as an adjustable stop to support the mast in a vertical position. The rod 42 can be regarded as forming an upper stop, although it does not normally function in this manner. The main function of the rod 42 is to screw down on to the plate 31 so that the plate 31 can be clamped against the collar 40 should it be required to hold the mast rigid.

The ultrasonic scanning mechanism 11 is secured to the carriage 10 by a solid strut 50 having a pivot bearing 51 at its free end to allow the mechanism to pivot slightly as it moves over irregularities on the interior surface of the vessel. The scanning mechanism 11 has four wheels 52 or castors arranged at the corners of a rectangular frame 53 to allow it to run over the vessel surface.

The ultrasonic transmit/receivei head (not shown) is mounted in the frame on a second pivot having its axis perpendicular to the mechanism pivot thereby creating a gimbal mounting whereby the ultrasonic transmit/receive head is able to follow the contours of the interior surface.

In use, the mast carriage (as represented in FIG. 3 by member 30) is moved along its beam to carry the mast and the ultrasonic scanning mechanism carried on the base side 'B' of the mast, towards the wall of the pressure vessel until the wheels 52 of the scanning mechanism contact the wall. Thereafter, any further movement of the carriage causes the mast to tilt so that plate 31 lifts away from collar 40. This movement is detected by the probe 46. The carriage is then moved a predetermined amount, such as 5 centimeters, to tilt the mast and thereby load the scanning mechanism against the wall of the pressure vessel with a load in the region of about 10 kilograms. If the beam having the mast carriage is now rotated on its slewing ring the scanning mechanism is taken on a circular scan along a band on the interior wall of the pressure vessel. If the axis of the slewing ring is not truly located on the axis of the pressure vessel or, if the interior surface of the vessel is not truly cylindrical about that axis the mast will be caused to pivot within the range permitted, such as within the 5 centimeters "set" on the mast by the carriage, without seriously affecting the loading of the scanning mechanism against the wall of the pressure vessel.

The pivoted mast arrangement is particularly important in the context of a carriage movable along a beam on a slewing ring on a bridge as the variable eccentric loading that can arise as the beam is slewed and as the carriage is moved can set up some variable deflection of that part of the mast at which the scanner carriage is located.

We claim:

1. Apparatus for moving an ultrasonic scanning mechanism over the interior surface of a pressure vessel, the apparatus comprising:
   a bridge for spanning the mouth of a pressure vessel,
   a slewing ring on the bridge,
   a beam carried by the slewing ring,
   a mast carriage linearly movable along the beam,
   a mast supported from the mast carriage, and
   a scanner carriage movable along the mast for carrying ultrasonic scanning mechanisms,
   wherein the mast depends at a pivotable joint from the mast carriage 2. Apparatus according to claim 1 wherein the axis of the pivotable joint is off-set from the longitudinal axis of the mast, the off-set being to that side of the mast which carries the scanner carriage.

3. Apparatus according to claim 2 wherein an indicator probe secured to the mast carriage yieldably abuts the mast for indicating pivoting of the mast.

4. Apparatus according to claim 3 wherein the mast carriage has adjustable stops for limiting the angle of pivoting of the mast.

5. Apparatus according to claim 4 wherein ultrasonic scanner mechanism attached to the scanner carriage through a gimbal mounting and the mechanism has guide wheels for running about the interior surface of the vessel and for spacing an ultrasonic probe of the mechanism from the surface of the vessel.

* * * * *